Dec. 11, 1962     I. JEPSON ET AL     3,068,342
COOKING VESSEL
Filed June 4, 1958     4 Sheets-Sheet 2
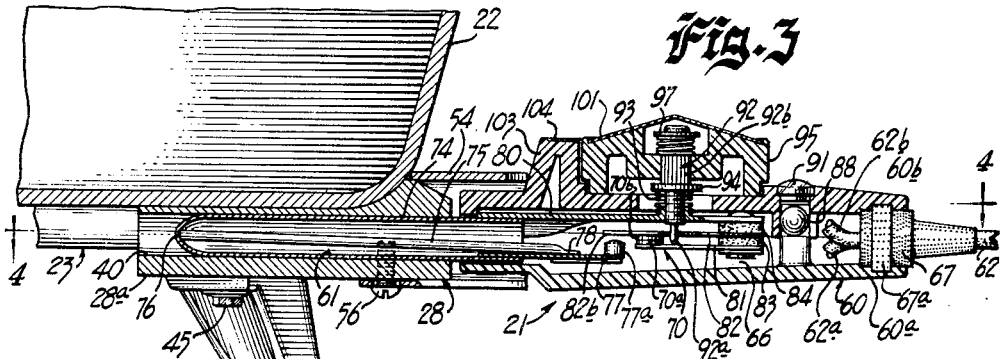
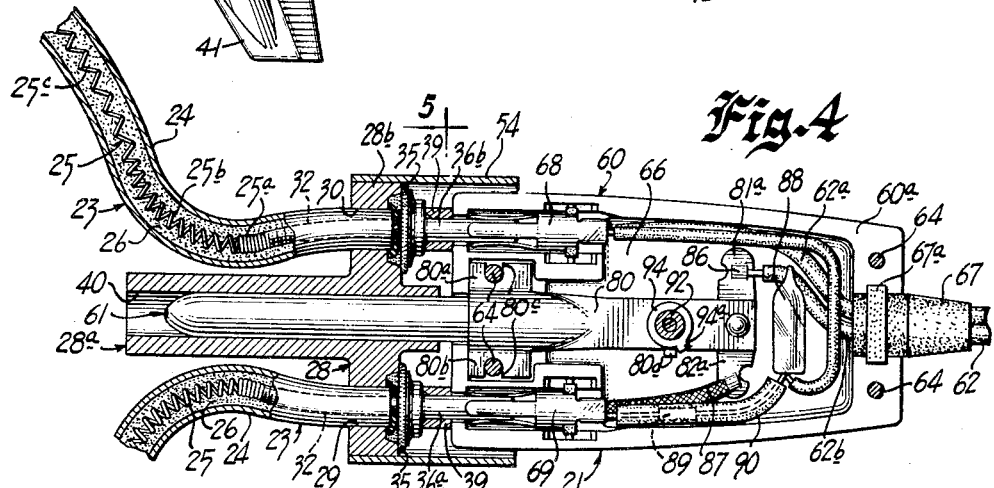
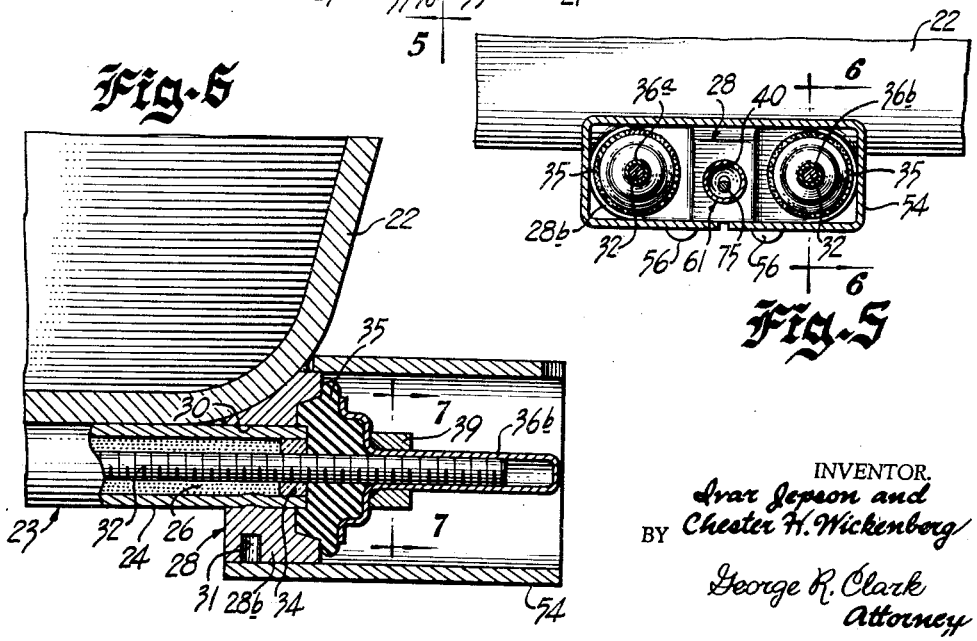
INVENTOR.
Ivar Jepson and
BY Chester H. Wickenberg
George R. Clark
Attorney

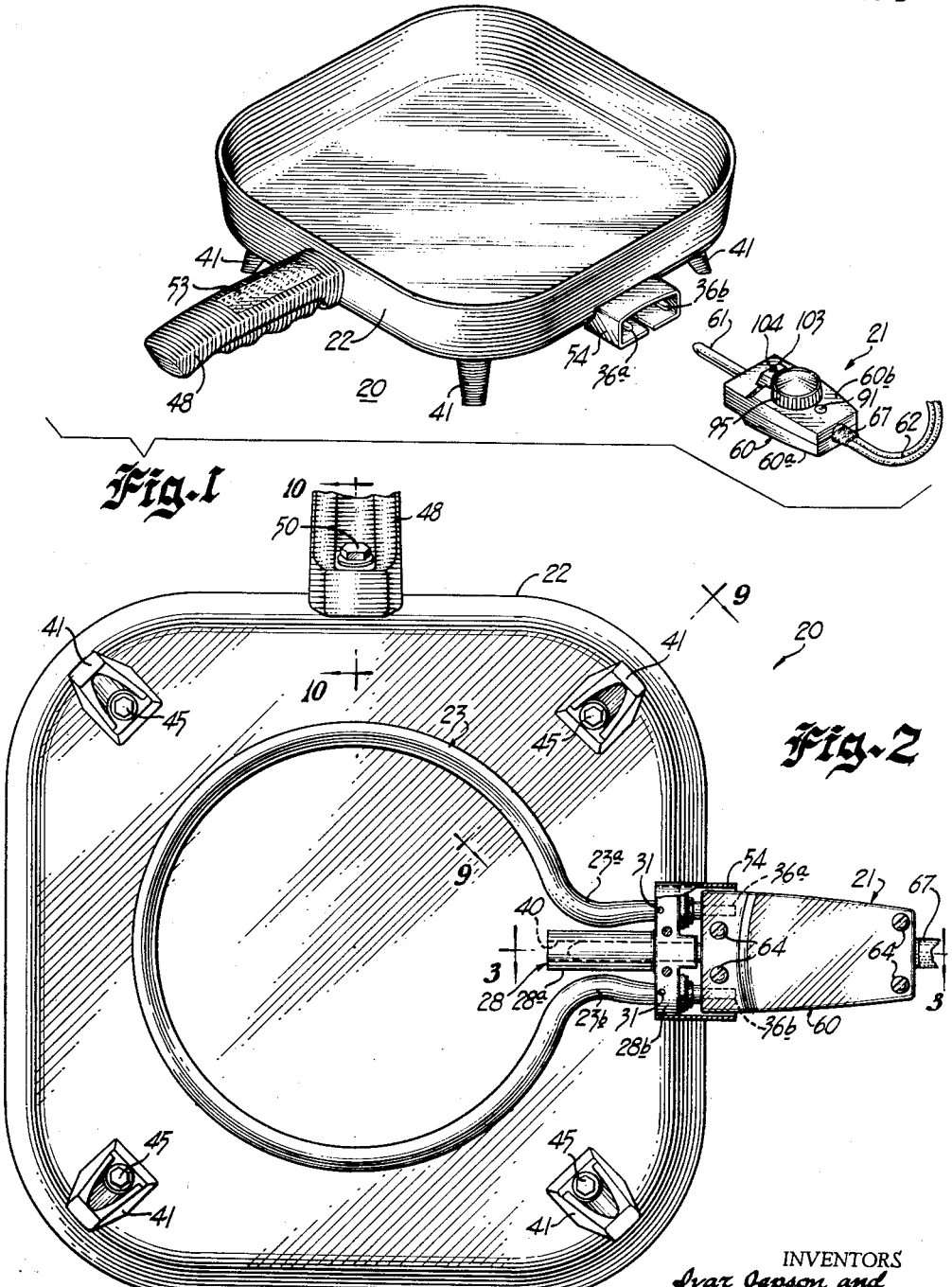

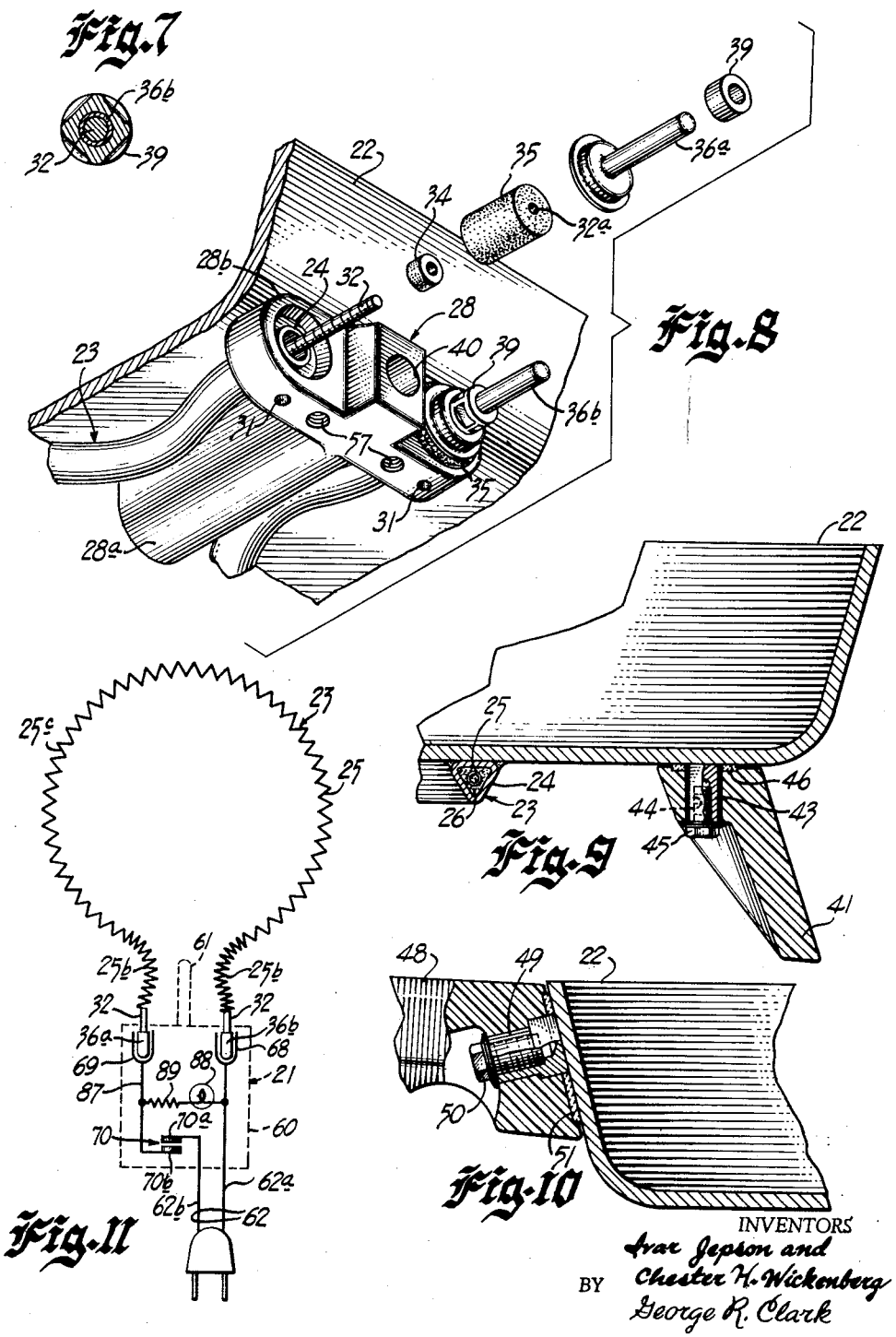

Dec. 11, 1962 I. JEPSON ETAL 3,068,342
COOKING VESSEL
Filed June 4, 1958 4 Sheets-Sheet 4
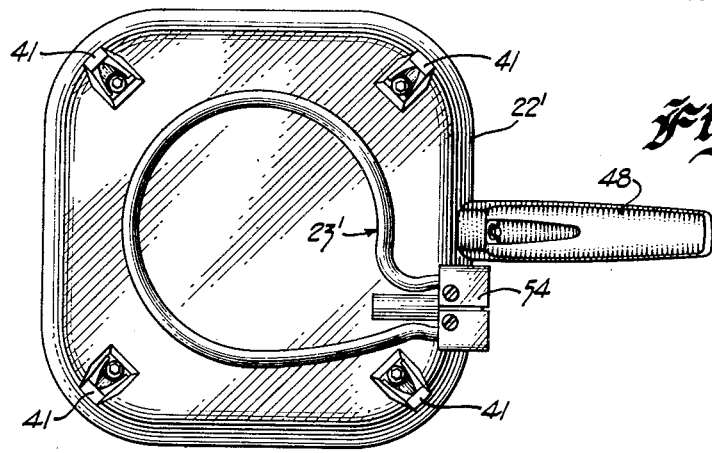
Fig. 12
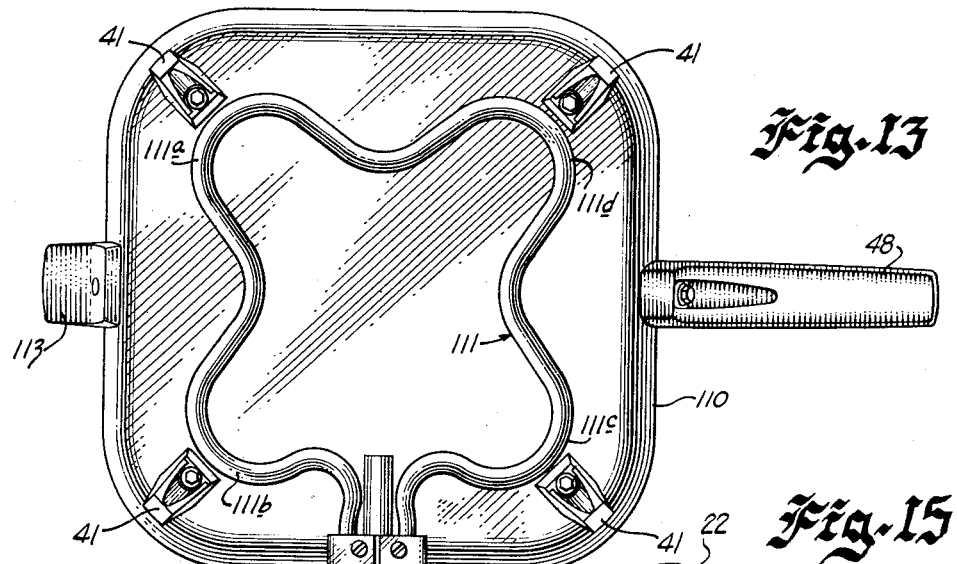
Fig. 13
Fig. 15
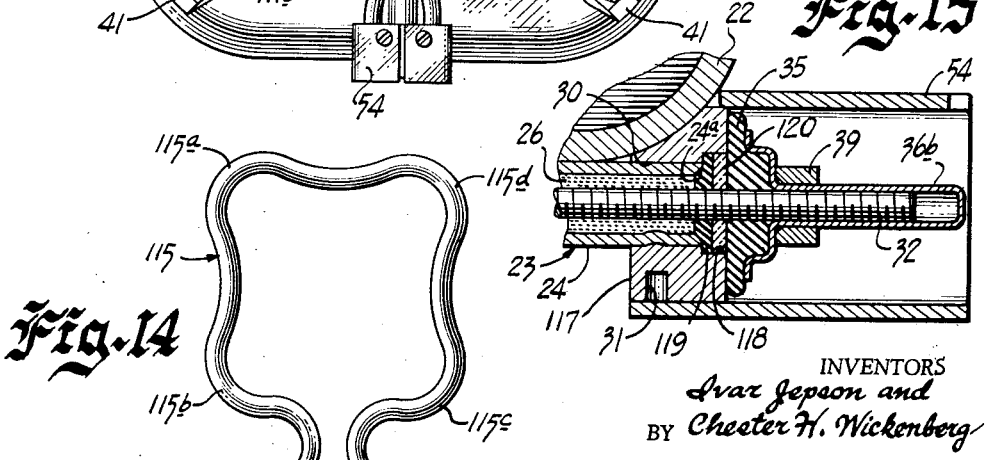
Fig. 14
INVENTORS
Ivar Jepson and
BY Chester H. Wickenberg
George R. Clark
Attorney · # United States Patent Office 3,068,342
Patented Dec. 11, 1962

3,068,342
COOKING VESSEL
Ivar Jepson, Oak Park, and Chester H. Wickenberg, Elgin, Ill., assignors to Sunbeam Corporation, Chicago, Ill., a corporation of Illinois
Filed June 4, 1958, Ser. No. 739,876
8 Claims. (Cl. 219—44)

The present invention relates to a cooking vessel, and more particularly to a self-contained electrically heated temperature controlled cooking vessel which is completely immersible in liquid for cleaning purposes.

Self-contained electrically heated cooking vessels have been extensively sold ever since the development of the vessel disclosed and claimed in Jepson Patent No. 2,744,995, granted May 8, 1956, and assigned to the same assignee as the instant application. A cooking vessel substantially like that disclosed in the above-mentioned patent was introduced to the trade in 1953 and was immediately successful. That cooking vessel can be purchased in any city of the United States and in many other countries of the world. One of the principal reasons for the immediate success of the cooking vessel of the prior Jepson patent is the fact that the vessel was immersible for cleaning purposes. It was, in fact, the first electrically heated automatically controlled cooking vessel which could be immersed in liquid for cleaning purposes. Since the introduction of that cooking vessel, many others have come on the market. In fact, it is safe to say that the accepted way of cooking today is by means of a self-contained automatically controlled cooking vessel rather than the old-fashioned way of heating such a vessel on a kitchen range. For reasons set forth in the above-mentioned Jepson patent, it is generally conceded today that the electric or gas range, as it was known in the past, will soon give way to self-contained cooking units.

The self-contained cooking units with control means for controlling the temperature generally comprise a vessel with the bottom of which is associated an electric heating element usually of the sheathed type. The vessel is conventionally manufactured, at least in part, of a good heat conducting material, such as aluminum, so that the heat from the heating element is relatively uniformly distributed over the bottom of the vessel which defines the cooking surface on the opposite side thereof. For the purpose of controlling the temperature, suitable temperature sensing or temperature responsive means are included. Such temperature responsive control means are generally selectively adjustable to produce controlled temperatures all the way from warming temperatures up to high heat temperatures. Where the temperature control means is built into the vessel or the handle thereof, the temperature sensing element will, of couse, be in intimate heat exchange relationship with the vessel at all times. In other cooking devices of the self-contained type, the temperature control means may be separable from the vessel itself so that during the washing operation it is unnecessary to immerse the portion of the vessel which contains the temperature control means, since the latter is physically removed from the vessel. Such devices either require a removable temperature sensing probe or the like which is associated in good heat conducting relationship with the bottom of the vessel as is disclosed, for example, in copending Jepson and Hill application Serial No. 501,652, filed April 15, 1955, and assigned to the same assignee as the instant application, or an arrangement in which the temperature sensing element is physically embodied in the vessel portion but the control means for controlling the heating is physically removed from the vessel as is disclosed, for example, in copending Koci et al. application Serial No. 590,694, filed June 11, 1956, and also assigned to the same assignee as the instant application.

Although the temperature control means of cooking vessels such as disclosed in Jepson Patent No. 2,744,995 operate very satisfactorily, as is evidenced by the millions of cooking vessels of this type employed in the United States today, there is an advantage in a cooking vessel of the type disclosed in the copending Jepson and Hill application referred to above, in that a single removable temperature sensing element and control unit may be employed with a plurality of different cooking vessels. In other words, a housewife may own a frying pan, a large saucepan, a small saucepan and a griddle, all having built-in electrical heating elements together with a selectively operable temperature responsive control means which may selectively be associated with any one of the four units. Consequently, from the standpoint of economy, a saving will result if the temperature responsive control means is removable from the vessel and is capable of being associated with different cooking vessels. As a matter of fact, the housewife may have four or more cooking vessels and, say, a maximum of two control units whereby any two vessels may be employed simultaneously. Accordingly, the present invention is concerned with cooking vessels of the type having a removable selectively operable temperature control unit and is in the nature of an improvement on the copending Jepson and Hill application referred to above.

It would be desirable to provide a cooking vessel of simple, compact and sturdy construction which is completely immersible in cleaning liquids of all sorts and yet which may be associated with an electrical control unit giving accurate temperature control of the heat supplied to the cooking surface of the vessel. Such vessel should have a pleasing appearance so as not to detract from the beauty of the kitchen or other room in which the vessel is used, and so as to provide adequate, accurate controlled heat at all times.

Accordingly, it is an object of the present invention to provide a new and improved self-contained electrically heated cooking vessel.

It is another object of the present invention to provide an improved cooking vessel having a removable temperature responsive control unit which may be associated with a plurality of similar vessels to convert each of such vessels into an automatically controlled cooking vessel.

It is a further object of the present invention to provide an improved self-contained cooking vessel which may be completely immersed in a cleaning fluid for washing purposes without any deleterious effect to the electric heating means, and wherein the temperature responsive control means is completely removable from the vessel during such cleaning operation.

It is a further object of the present invention to provide an improved temperature responsive control unit for association with electrically heated cooking vessels to provide selective temperature control of said vessels over a wide heating range.

A still further object of the present invention resides in the provision of improved sealing means for the electrical heating element associated with a cooking vessel.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is an exploded perspective view of a cooking vessel and a separable temperature control means for such vessel;

FIG. 2 is an enlarged bottom view of the cooking vessel of FIG. 1;

FIG. 3 is a fragmentary sectional view taken on line 3—3 of FIG. 2;

FIG. 4 is a sectional view taken on line 4—4 of FIG. 3, assuming that FIG. 3 shows the complete structure;

FIG. 5 is a sectional view taken on line 5—5 of FIG. 4, also assuming that FIG. 4 shows the complete structure;

FIG. 6 is an enlarged fragmentary sectional view taken on line 6—6 of FIG. 5, assuming that FIG. 5 shows the complete structure but with the control unit removed;

FIG. 7 is a sectional view taken on line 7—7 of FIG. 6, assuming that FIG. 6 shows the complete structure;

FIG. 8 is an exploded perspective view of a fragmentary portion of the cooking vessel of the present invention with reference to the terminals of the electric heating element;

FIG. 9 is an enlarged fragmentary sectional view taken on line 9—9 of FIG. 2;

FIG. 10 is a fragmentary enlarged sectional view taken on line 10—10 of FIG. 2;

FIG. 11 is a schematic diagram illustrating the electrical circuit embodied in the cooking vessel of the present invention;

FIG. 12 is a view similar to FIG. 2 illustrating a modification of the present invention;

FIG. 13 is a view similar to FIG. 2 illustrating still another modification of the present invention;

FIG. 14 is a view showing the sheathed heating element only of still another modification of the present invention; and FIG. 15 is a fragmentary sectional view somewhat similar to FIG. 6 of the drawings illustrating another modification of the present invention.

Referring now to the drawings, there is illustrated a cooking vessel generally designated at 20 comprising a removable selectively controlled temperature responsive means 21 which may be physically removed from the vessel during cleaning operations of the vessel, but which, when associated with the vessel, provides accurate temperature control at any selective setting thereof. Considering first the cooking vessel and the construction thereof independent of the control unit 21, it comprises a vessel portion 22 which may be formed of any suitable metal. In a device built in accordance with the present invention it comprised an aluminum stamping of relatively light weight so that the entire vessel 20 weighed only slightly over three pounds. The vessel portion 22 has been specifically illustrated as of rectangular shape with rounded corners and having a relatively shallow depth so as to define what is commonly referred to as a frying pan. It should be understood, however, that the particular size and shape of the vessel 22 forms no part of the present invention and is by way of example only. The vessel 22 might equally well comprise a large or small saucepan, a griddle, a pressure cooker or the like, and the present invention will apply equally well regardless of the particular type of cooking vessel involved.

For the purpose of heating the vessel 22, there is associated with the bottom of the vessel an electric heating element generally designated by the reference numeral 23 which is preferably of the well-known sheathed type. Such sheathed heating elements generally comprise an outer metal sheath 24 containing generally at the center thereof a resistance element 25 usually in somewhat coiled form. The space within the sheath 24 and between the turns of the coiled resistance element 25 is filled with a material which is a good electrical insulator but at the same time is also a relatively good heat conductor. Such material has generally comprised a compacted magnesium oxide designated by the reference numeral 26 in the drawings.

The heating element 23 is illustrated as of somewhat C shape, although in an embodiment illustrated in FIGS. 13 and 14 of the drawings a somewhat different shape is employed, as will be described in detail hereinafter.

Such sheathed heating elements are generally of circular cross section, and the heating element 23 is ordinarily manufactured so that the outer sheath 24 is of circular cross section. However, to insure better heat transfer the bulk of the sheathed heating element 23, except near the terminals thereof, has its circular cross section deformed to a triangular cross section as clearly shown in FIG. 9 of the drawings. One side of the triangular cross section of the heating element 23 is then placed into contact with the bottom of the vessel and is suitably secured to the bottom of the vessel by a brazing or welding operation. It will be appreciated that instead of a line contact of the heating element 23 with the bottom of the vessel 22, which normally is the case with a sheathed heating element of circular cross section, there is obtained with the triangular cross section of the present invention a substantial area of contact clearly apparent from FIG. 9 of the drawings. This insures good heat transfer between the heating element and the bottom of the vessel, and a relatively uniform temperature is obtained throughout the entire cooking surface by virtue of the relatively wide area of contact between the sheathed heating element 23 and the vessel and, of course, the high conductivity of the metal from which the vessel 22 is constructed.

For the purpose of supporting the terminals of the sheathed heating element 23, and also to provide means for insuring that the temperature control means 21 is accurately responsive to the temperature of the cooking surface, there is provided a heating element support generally designated at 28 which, as is best shown in FIGS. 2 and 4, is somewhat in the shape of a cross comprising an elongated tubular portion 28a and a transversely disposed portion 28b, which latter has defined therein a pair of spaced openings 29 and 30 (FIG. 4) for receiving the ends of the sheathed heating element 23 which, as was pointed out above, are maintained in the original circular cross section. The heating element support 28 is preferably an aluminum casting shaped to fit the contour of the vessel 22 (FIG. 3), and the sheathed element 23 has the ends thereof inserted into the openings 29 and 30. By means of a suitable staking operation, the stake holes being indicated at 31, the heating element support 28 becomes an integral part of the sheathed heating element 23 prior to assembly with the bottom of the vessel 22. It will be appreciated that, as is conventionally the case, the ends of the resistance element 25 are provided with suitable element core terminals, such as 32, only one of them being shown in FIGS. 6 and 8 of the drawings, but both being visible in FIG. 4 of the drawings. These terminals 32 extend into the sheath 24 and are electrically connected with the resistance wire 25 in any suitable manner forming no part of the present invention. Consequently, when the heating element 23 is assembled with the heating element support 28, the element core terminals 32 project beyond the ends of the support 28 in the manner best shown in FIGS. 6 and 8 of the drawings.

So that the cooking vessel 20 may be completely immersible, it is important that the heating element and core terminals are completely sealed against the entrance of any moisture. In accordance with the present invention, during the manufacture of the heating element 23 all moisture is driven out of the same and the ends are then sealed by a suitable material, such as a silicone base oil or a cement. This may be accomplished before or after a suitable annular ceramic insulating member 34 is applied into the end of the sheath, as is best shown in FIGS. 6 and 8 of the drawings. This ceramic member 34 insures proper positioning of the element core terminals 32 at all times.

In accordance with the present invention there is employed a terminal seal 35 formed of silicone, which is of generally cylindrical construction, as is best shown in FIG. 8 of the drawings, and which has a central opening 32a for the element core terminals 32. This silicone seal 35 has an exterior diameter substantially larger than the exterior diameter of the sheath 24 of the heating element 23, and the central opening 32a is substantially smaller than the diameter of the associated core terminal 32. This terminal seal is placed in position concentric with the element core terminal 32 and then is highly compressed to the position shown in FIG. 6 of the drawings to provide a foolproof seal for the ends of the sheathed heating element 23. This seal may be obtained in the following manner. For the two element core terminals 32 of the heating element 23, there are provided terminal members 36a and 36b, as best shown in FIG. 8 of the drawings, which are preferably formed of a nickel plated brass and are of tubular construction closed at one end and having an enlarged flare at the open end. This construction is clearly shown in FIGS. 6 and 8 of the drawings. The terminal members 36a and 36b are applied to the element core terminals 32 after the silicone seals 35 are in place, and a suitable compressive force is applied to compress the seal 35 to the condition shown in FIG. 6 of the drawings. A locking member 39 is then deformed as shown in FIG. 7 of the drawings, securely to lock the terminal members 36a and 36b to the element core terminals 32 thereby maintaining the silicone seal under compression, and deformed in the manner shown in FIG. 6 of the drawings.

It should be understood that in the manufacture of the cooking vessel of the present invention the subassembly comprising the heating element support 28 and the sheathed heating element 23 is secured to the bottom of the vessel in intimate heat exchange relationship therewith prior to applying the terminal seals 35 and the terminal members 36a and 36b. Moreover, the heating element support 28 is also welded or brazed to the bottom of the vessel 22 in intimate heat exchange relationship therewith so that the tubular portion 28a is at all times at a temperature representative of the temperature of the bottom of the vessel. It will be understood that the tubular portion 28a of the support 20 has a bore 40 therein for receiving a portion of the temperature control element 21, as will be described in greater detail hereinafter. This bore 40 is open at both ends so that during the washing or cleaning operation no fluid will be trapped therein.

In accordance with the present invention the sheathed heating element 23 is provided with a particular shape adjacent the tubular portion 28a of the heating element support 28 which, incidentally, is disposed between the terminal members 36a and 36b and, consequently, between the ends of the C-shaped heating element 23, as is clearly apparent from FIGS. 2 and 4 of the drawings. Instead of the ends of the sheathed heating element being parallel with each other for the portion thereof leading from the extremities of the C to the terminal members 36a and 36b, each of these ends is provided with a radius of curvature designated as 23a and 23b (FIG. 2) to bring a portion of the heating element at either side of the support 28 closer to the bore 40 in the heating element support 28 than would normally be the case. This has been found to insure that the support 28 is more accurately representative of the temperature of the bottom of the vessel 22 than would otherwise be the case. In addition, the resistance element 25 within the sheath 24 of the sheathed heating element 23 is constructed somewhat differently within these short sections thereof closely adjacent the support 28 and indicated as 23a and 23b. Specifically in this short section, the heating element 25 is provided with more closely spaced turns than is the case throughout the major part of the C-shaped heating element, thus insuring a slightly higher heat dissipation immediately adjacent the heating element support 28. This causes the temperature responsive control device described in detail hereinafter to have an anticipating effect to hold to a minimum any overshoot upon initial heating of the cooking vessel. Actually and as is best shown in FIGS. 4 and 11 of the drawings the turns of the resistance heating element 25 are very closely spaced as indicated at 25a where electrical connection with the terminals 32 is made, are fairly closely spaced as indicated at 25b during the short sections 23a and 23b mentioned above adjacent the heating element support 28, and are substantially less closely spaced as indicated at 25c for the remainder and major portion of the sheathed heating element 23.

In order that the cooking vessel 22 may be supported from surfaces which are not heat resistant, such as tables and other furniture, the vessel is provided with a plurality of supporting legs 41 preferably formed from a suitable phenolic resin, such as Bakelite. These legs may be secured to the bottom of the vessel 22 in any suitable manner. As illustrated best in FIG. 9 of the drawings, suitable foot studs 43 of rectangular cross section, having one end thereof butt-welded to the vessel, are provided, one foot stud adjacent each corner of the vessel. Each foot stud is provided with a tapped opening 44 for receiving a suitable screw 45 which may have a washer-type head which firmly secures the associated foot 41 to the vessel. The feet 41 are provided with openings of rectangular cross section just large enough to receive the foot studs 43 of corresponding cross section, whereby relative rotation of the feet 41 about the axes of the foot studs 43 is prevented. For the purpose of reducing the heat transfer between the vessel 22 and the feet 41, there preferably is provided an interposed washer 46, formed of asbestos or similar material, which spaces the feet 41 from the bottom of the vessel 22, as is clearly indicated in FIG. 9 of the drawings.

It will be understood that such a cooking vessel is generally provided with a handle so that the housewife may manipulate the vessel during the cooking operation. To this end there is provided a handle 48, preferably formed of a molded phenolic resin, such as Bakelite, and which handle preferably has molded therein a contour grip to increase the ease of handling the vessel. In order to secure this handle to the vessel, a handle stud 49 (FIG. 10), quite similar to the foot studs 43, may be provided and suitably welded to the side wall of the vessel 22. A fastening screw 50 passing through a portion of the handle 48, as best shown in FIG. 10 of the drawings, engages a suitable tapped opening in the handle stud 49. Preferably an insulating washer of asbestos 51 is interposed between the vessel wall and the handle 48 to provide a space therebetween to insure a relatively low temperature of the handle 48. Preferably also the top of the handle 48 is provided with a suitable cook guide designated by the reference numeral 53 in FIG. 1 of the drawings, which indicates the particular temperature settings for specific foods to be cooked.

As illustrated in FIG. 2 of the drawings, the handle 48 is disposed on one side of the vessel, and the terminals 36a and 36b are disposed on another side of the vessel, with the axis of the terminals disposed at 90° relative to the handle. It will be appreciated that this positioning of the terminals and the handle is by way of example and the handle might be disposed on the same side of the vessel as the terminals, as is indicated in FIG. 12 of the drawings. By positioning the terminals 36a and 36b on a side of the vessel different from the handle, it will be apparent that the control 21 which will have suitable control indicia thereon as described hereinafter will be clearly visible at all times, whereas if it were provided on the handle side of the vessel the handle might interfere with clear vision thereof.

For the purpose of protecting the terminals 36a and 36b and providing an effective receptacle for the control unit 21, a suitable terminal cover 54 is provided which encloses the terminals 36a and 36b. Preferably the terminal cover 54 is secured to the heating element support 28 by suitable screws 56 best shown in FIGS. 3 and 5 of the drawings, which screws engage tapped openings 57 in the heating element support 28 (FIG. 8).

Before describing the selective temperature control unit 21 which is completely removable from the vessel portion 22 of the cooking vessel 20, it will be appreciated that the cooking vessel described heretofore is completely immersible for cleaning purposes, and the sheathed heating element and associated terminals are completely sealed against the entrance of moisture. To facilitate cleaning the vessel portion 22, it is preferably provided with a highly polished exterior, and the bottom of the vessel is also of smooth construction for easy cleaning.

Considering now the control unit 21 best shown in FIGS. 1, 3 and 4 of the drawings, it comprises a two-part insulating housing 60 from which projects a probe 61 receivable within the bore 40 of the heating element support 28. The probe 61 has a rounded end to facilitate entry thereof into the bore 40, and has a circular cross section so as to be snugly received in the bore 40 for good heat transfer relationship therewith, without however interfering with ready insertion or removal thereof. Also extending from the housing 60 is a suitable power cord 62 which is adapted to be connected in a conventional manner to a suitable power outlet. It will be appreciated that the control unit 21 is both the female portion of a plug receptacle for supplying power to the heating element 23 and, in addition, includes a temperature sensing and control means for controlling the supply of electrical energy to the heating element 23.

Referring now to FIGS. 3 and 4 of the drawings, the housing 60 is preferably formed of a molded insulating material and comprises a lower section 60a and an upper section 60b which are secured together by a plurality of fastening means 64 thereby to define a suitable control chamber 66 within the housing 60. As illustrated, the power cord 62 is provided with a strain relief member 67 having an annular ridge 67a receivable in cooperating recesses defined within the housing sections 60a and 60b so that when these housing sections are clamped together by the fastening means 64 the strain relief 67 is firmly secured to the housing against removal thereof by tensile forces applied to the cord 62.

In order to provide a readily separable electrical connection with the terminals 36a and 36b, a pair of female-type telescopic contacts 68 and 69 are provided, which are suitably disposed in cooperating recesses defined in the housing sections 60a and 60b, which recesses open to the exterior of the housing to permit ready insertion of the terminals 36a and 36b when the housing 60 is inserted into the terminal cover 54. One conductor of the power cord 62 designated as 62a is directly connected to the female-type telescopic terminal 68, while the other terminal 69 is connected to the other conductor 62b through a pair of relatively movable contacts 70a and 70b defining a temperature responsive switch generally indicated by the reference numeral 70 and disposed within the chamber 66.

In accordance with the present invention the switch 70 comprising the relatively movable contacts 70a and 70b forms a part of the temperature control assembly including the probe 61, and suitable selectively controlled temperature responsive means described hereinafter. As illustrated, the probe 61 is effectively a temperature sensing element comprising a tubular member 74 formed of one material and a rod 75 contained within the tube 74 formed of a different material specifically with respect to the coefficient of expansion thereof. As illustrated, the ends of members 74 and 75 at the closed end of probe 61 are welded together as indicated at 76. Secured to the open end of the tubular element 74 defining the probe 61 is a switch actuating member 77. The other end of the rod 75 is secured, as indicated at 78, to an intermediate portion on the switch actuating member 77. It will be apparent that the differential expansion between the members 74 and 75 will cause upward or downward movement of an insulating portion 77a of the switch actuating member 77. The members 74 and 75 are chosen of such materials that upon heating thereof the insulating member 77a will move upwardly as viewed in FIG. 3 of the drawings. This will be accomplished if the coefficient of expansion of the member 74 is greater than the coefficient of expansion of the member 75, since under these conditions the increase in length of the member 74 relative to the member 75 will cause the insulating portion 77a of the switch actuating member 77 to move upwardly as viewed in FIG. 3 of the drawings.

To support the switch 70 as a part of the temperature control assembly, a suitable support 80 is welded or otherwise secured to the tubular member 74. This support 80 is preferably provided with laterally projecting ears 80a and 80b, each provided with a notch 80c to receive one of the fastening means 64. Thus the probe 61 and support 80 are fixedly supported in the housing 60. Mounted on the support 80, and consequently forming a subassembly with the probe, are leaf spring members 81 and 82 forming a part of the switch 70. As illustrated, these leaf spring members are disposed in somewhat spaced parallel relationship and have one corresponding end of each clamped to the support 80 by suitable clamping means but with interposed insulating members 83 and 84. Also as illustrated, the leaf spring member 81 supports at the free end thereof the contact 70a, while the leaf spring member 82 somewhat similarly supports the contact 70b. As also illustrated, the leaf spring 82 is provided with an extension 82b engageable by the insulating portion 77a of the switch actuating member 77. Upon heating of the probe 61, with the resultant upward movement of insulating member 77a, as is viewed in FIG. 3 of the drawings, contact 70b is moved away from contact 70a to open the circuit at switch 70.

To electrically connect the switch 70 into the circuit, the leaf spring member 81 is illustrated as being provided with a laterally projecting ear 81a and, similarly, the leaf spring member 82 is provided with a laterally projecting ear 82a, which provide ready means for completing the electrical circuit. As illustrated, the conductor 62b of the power cord 62 is connected to the ear 81a as indicated at 86, while the ear 82a is connected by a conductor 87 with the terminal member 69.

To indicate when power is being supplied to the heating element 23, there preferably is provided a suitable indicating light 88 preferably comprising a neon light which is disposed within the chamber 66. This light is connected across the terminals 68 and 69, preferably in series with a suitable resistor 89. Preferably also a suitable insulating sleeve 90 encloses the resistor 89 and associated conductor. It will be apparent that the indicating light 88 will be energized whenever the switch 70 is closed and the power cord 62 is connected to a source of power. Preferably also the indicating light 88 is visible through an opening provided in the top housing section 60b, which opening may be closed by a suitable lucite lens designated as 91.

To provide selective control of the temperature of the cooking vessel 22, means are provided selectively to adjust the position of the contact 70a of switch 70 relative to the contact 70b, and to this end there is threadably mounted in the support 80 a suitable adjusting screw 92 having an insulated portion 92a for engaging the leaf spring 81 supporting the contact 70a. As illustrated, the insulated portion 92a extends through an enlarged opening defined in leaf spring 82. Moreover, the adjusting screw 92 forms a part of the subassembly comprising the probe 61, the switch 70 and the support 80. A suitable coiled compression spring 93, interposed between the support 80 and a washer 94 associated with the adjusting screw 92, will insure that the adjusting screw 92 remains in any position in which it is selectively set. The adjusting screw 92 is provided with a knurled portion 92b engageable with a suitable control knob 95 secured to the adjusting screw 92 as by suitable fastening means 97.

For the purpose of limiting the maximum rotation in each direction of the control knob 95, the washer 94 is provided with a projection 94a engageable with a stop 80d secured to the support 80, as is best shown in FIG. 4 of the drawings. The stop 80d engages either one side or the other side of the projection 94a.

Preferably the top of the control knob 95 is provided with a suitable temperature dial 101 which may be formed of aluminum foil or the like and which indicates the settings of the control unit 21, including a warming setting, a simmer setting, and a cooking setting, starting with relatively low cooking temperatures to a maximum cooking temperature. These cooking settings cooperate with the information provided on the cook guide 53. In order to indicate the particular setting of knob 95, the upper housing section 60b may be provided with an integral projection 103 having a triangular recess therein for receiving a triangular indicator 104.

It will be understood that for any adjustment of the knob 95 the temperature responsive element comprising the differentially expandable members 74 and 75 will open and close the switch 70 to maintain a constant temperature of the cooking surface at the particular setting of the control knob 95.

When it is desired to use the vessel 22, the control unit 21 is applied to the receptacle defined by the terminal cover 54, and the probe 61 is inserted into the bore 40. Simultaneously, electrical contact is made between the male terminals 36a and 36b and the corresponding female contacts 68 and 69. When the control unit 21 is fully inserted in the receptacle provided therefor, the housing 60 engages the locking members 39 and is slightly spaced from the terminal support 28, as is clearly shown in FIGS. 3 and 4 of the drawings. Thus the housing 60 is not subjected to the high temperatures of the terminal support 28 or other hot portions of the vessel 22.

The electrical circuit of the cooking vessel 20 is schematically indicated in FIG. 11 of the drawings, where the corresponding parts are designated by the same reference numerals as in the other figures of the drawings. In view of the detailed description included above, the operation of the cooking vessel 20 will readily be understood and no further discussion is included herewith.

In FIG. 12 of the drawings there is illustrated an electric cooking vessel generally designated by the reference numeral 22', having associated therewith a sheathed heating element generally designated at 23'. The corresponding parts of FIG. 12 are designated with the same reference numerals as in the preceding embodiments. The terminals of the heating element 23' instead of extending from a side different from the side to which the handle 48 is secured extend from the same side. The terminal support 28 and the terminal housing 54 are identical in FIG. 12 to those in the preceding embodiments, the only difference being their location with respect to the handle 48 of the vessel. Also, in FIG. 12 the portion of the heating element adjacent the terminal support 28 has an identical radius of curvature to that previously described, causing it to approach the terminal support 28 more closely to give anticipating effect to the temperature responsive control, thus preventing too great an overshoot when electric current is initially supplied to the heating element 23'.

Although the particular configurations of the heating element 23 as shown in FIG. 2, and 23' as shown in FIG. 12, have been found to be very satisfactory and insure relatively uniform temperature of the cooking surface of the cooking vessel 22 or 22', as the case may be, there is illustrated in FIG. 13 of the drawings a cooking vessel generally designated by the reference numeral 110 which, except for the shape of the heating element, is identical in every respect with the cooking vessel 22 described above, and the corresponding parts are designated by the same reference numerals as in the preceding embodiments. As illustrated in FIG. 13 of the drawings, there is provided a heating element 111 which is a sheathed heating element having a triangular cross section for the major portion thereof, as described above, and which, except for the particular configuration thereof relative to the bottom of the vessel 110, is identical in every respect to the heating element 23 described above, even insofar as the particular configuration thereof is concerned adjacent the terminal support 28. The heating element 111 of FIG. 13 is particularly adapted for use in connection with cooking vessels of large size to insure a more uniform temperature distribution. For example, electric cooking vessels of the shape of the cooking vessel 20 are made in various sizes, sometimes referred to as 10-inch, 11-inch and 12-inch sizes. When it comes to a large size vessel such as a 12-inch vessel, a problem arises in getting sufficient heat at the corners, and the heating element 111 is especially adapted to provide uniform heating for such large vessels. As illustrated, the heating element 111 is provided with four lobes, designated as 111a, 111b, 111c and 111d, each of these lobes, as is clearly shown in FIG. 13, extending toward a respective one of the corners of the vessel. Between the lobes 111a, 111b, 111c and 111d is another curved portion which interconnects the lobes in a smooth curve. Due to the shape of the heating element 111, it is apparent that good heating at the corners of the vessels is provided. Also, due to the shape of the adjacent portions of two adjacent lobes, uniform heating of the outer portion of the vessel between the lobes is likewise obtained, and the same is true of the space within the confines of the heating element 111.

It should be understood that the heating element 23 of FIG. 12 could have the configuration of the heating element 111 of FIG. 13, or the heating element 111 of FIG. 13 might have its terminals disposed in the position of the terminals of FIG. 12.

The cooking vessel 110 is illustrated as having, in addition to the handle 48, a small handle portion 113 secured to the vessel 110 in any suitable manner on the side thereof opposite to that to which the handle 48 is secured. This gives the user an additional means of supporting a relatively large cooking vessel.

The lobed type heating element such as 111 can also be used satisfactorily on cooking vessels of smaller size, and in FIG. 14 of the drawings there is illustrated the shape of a lobed heating element for use with a vessel of the size of the cooking vessel 20 shown in FIG. 2 of the drawings. The heating element there is designated by the reference numeral 115, and the corresponding lobes thereof as 115a, 115b, 115c and 115d. In this connection the lobe extending toward each corner of the vessel is not as pronounced as in a larger size vessel such as shown in FIG. 14, but more uniform heating is obtainable than with a simple C-shaped element.

In FIG. 15 of the drawings there is illustrated a modification of the terminal structure of the heating element 23. The parts of FIG. 15 identical with the corresponding parts of the preceding figures are designated by the same reference numerals as in the preceding figures. In FIG. 15 there is illustrated a heating element support 117 which is very similar to the support 28 in the preceding embodiments. Like the member 28, the support 117 is also in the shape of a cross including the elongated tubular portion (not shown in FIG. 15) of the preceding embodiments. It will be appreciated that the cross-shaped construction of the elements 28 and 117 provides a very desirable feature in that it permits substantially complete enclosure of the probe 61 so that it is accurately responsive to the temperature of the bottom of the cooking vessel. If a T-shaped or other shaped construction were employed, then a substantial portion of the probe 61 would not be enclosed, thus inducing inaccuracies in temperature control.

As in the preceding embodiment, a sheathed type electric heating element 23 has the ends thereof inserted into suitable openings such as the opening 30 in the element 117, and is united thereto by a staking operation or the like as indicated at 31 to integrally unite the support 117 with the heating element 23.

In accordance with the present invention, the end of the sheath 24 is bevelled as indicated at 24a to make sure that the desired electrical clearance is obtained. Also as illustrated in FIG. 15, the end of the sheath 24 is flush with the end of a recess or counterbore 118 defined in the support 117, which counterbore accommodates a suitable annular silicone rubber sealing member 119 and a ceramic disk 120. In an embodiment built in accordance with the present invention, the elements 119 and 120 were both one-sixteenth of an inch in thickness. The seal of the ends of the sheathed heating element is then completed by means of the silicone sealing member 35 identical with the previously described element 35, together with the terminal members such as 36b and the locking member 39. It will be appreciated that the silicone terminal seal 35 is initially of the shape shown in FIG. 8 of the drawings and assumes the compressed shape of FIG. 15 upon completion of the sealing operation.

While there have been illustrated and described several embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. An immersible type electrical heating device comprising a heating surface, a sheathed type electric heating element disposed in intimate heat exchange relationship with said surface, an electrical terminal projecting from the end of the sheath of said heating element, means for sealing the end of said sheath against the entrance of moisture comprising an elongated tubular terminal member and a resilient annular sealing member, said tubular terminal member being closed at one end and including a cup-shaped enlargement at the other end, said terminal extending into the open end of said tubular terminal member with said annular sealing member compressed between said sheath and said enlargement and partially contained in said enlargement, and means for securing said terminal member to said terminal to maintain the compressed condition of said sealing member.

2. In an immersible type cooking vessel, the combination of a cooking surface, a sheathed type electric heating element disposed in intimate heat exchange relationship with said cooking surface, a pair of electrical terminals projecting one from each end of the sheath of said sheathed heating element, said terminals being disposed adjacent each other, means for sealing the ends of said sheath against the entrance of moisture comprising for each end an elongated tubular terminal member and a resilient annular sealing member, said tubular terminal member being closed at one end and including a cup-shaped enlargement at the other end, each of said terminals extending into the open end of one of said tubular terminal members with said annular sealing member compressed between said sheath and said enlargement and partially contained in said enlargement, and locking means for securing said terminal member to its associated terminal to maintain the compressed condition of said sealing member.

3. The heating device of claim 1 wherein said sealing member comprises silicone.

4. An immersible type electrical heating device comprising a heating surface, a sheathed type electric heating element disposed in intimate heat exchange relationship with said surface, an electrical terminal projecting from the end of the sheath of said heating element, a ceramic sleeve surrounding a portion of said terminal within said sheath for centering the same, means for sealing the end of said sheath against the entrance of moisture comprising an elongated tubular terminal member and a resilient annular sealing member, said tubular terminal member being closed at one end and including a cup-shaped enlargement at the other end, said terminal extending into the open end of said tubular terminal member with said annular sealing member compressed between said sheath and said enlargement and partially contained in said enlargement, and means for securing said terminal member to said terminal to maintain the compressed condition of said sealing member.

5. The heating device of claim 1 wherein a ceramic element concentric with said terminal is positioned to engage said sealing member.

6. The cooking vessel of claim 2 wherein said last mentioned means comprises a deformable locking member concentrically disposed with respect to said terminal member.

7. In an electrical heating device, a heating surface, a sheathed type electric heating element secured in intimate heat exchange relationship with said surface, said heating element comprising a pair of terminals disposed in spaced parallel relationship, a terminal support comprising an elongated tubular portion and a transverse portion arranged in the form of a cross, said transverse portion including a pair of openings one on either side of said tubular portion, the ends of said sheathed heating element extending into said openings, means for securing said terminal support in intimate heat exchange relationship with said surface with said tubular portion disposed between said terminals, and a pair of resilient sealing members one for each end of said sheathed heating element compressed to seal the ends of the sheath of said heating element as well as one end of said openings in said transverse portion.

8. An electric cooking vessel comprising a cooking surface, a sheathed type electric heating element secured in intimate heat exchange relationship with said surface, said heating element comprising a pair of terminals disposed in spaced parallel relationship, a terminal support comprising an elongated tubular portion and a transverse portion arranged in the form of a cross, said transverse portion including a pair of openings one on either side of said tubular portion, the ends of said sheathed heating element extending into said openings, means for securing said terminal support in intimate heat exchange relationship with said surface with said tubular portion disposed between said terminals, and a removable control element including a temperature sensing element insertable into said tubular portion of said support.

References Cited in the file of this patent

UNITED STATES PATENTS

| | | |
|---|---|---|
| 1,127,373 | Read | Feb. 2, 1915 |
| 1,553,367 | Colby | Sept. 15, 1925 |
| 2,286,470 | Dafforn et al. | June 16, 1942 |
| 2,489,998 | Charbonneau et al. | Nov. 29, 1949 |
| 2,624,829 | Dzaack | Jan. 6, 1953 |
| 2,725,453 | Haller | Nov. 29, 1955 |
| 2,744,995 | Jepson | May 8, 1956 |
| 2,780,704 | Charbonneru | Feb. 5, 1957 |
| 2,838,650 | Lehr | June 10, 1958 |
| 2,840,676 | King | June 24, 1958 |
| 2,850,616 | Hatch | Sept. 2, 1958 |
| 2,914,650 | Sheahan | Nov. 24, 1959 |
| 2,926,230 | Foster | Feb. 23, 1960 |
| 2,927,189 | Purpura | Mar. 1, 1960 |

FOREIGN PATENTS

| | | |
|---|---|---|
| 929,386 | France | July 7, 1947 |
| 133,368 | Australia | July 14, 1949 |
| 204,091 | Australia | Sept. 20, 1956 |